Nov. 18, 1924.  1,515,915
F. A. VALENTA
PORTABLE REPAIR UNIT
Filed Jan. 3, 1924
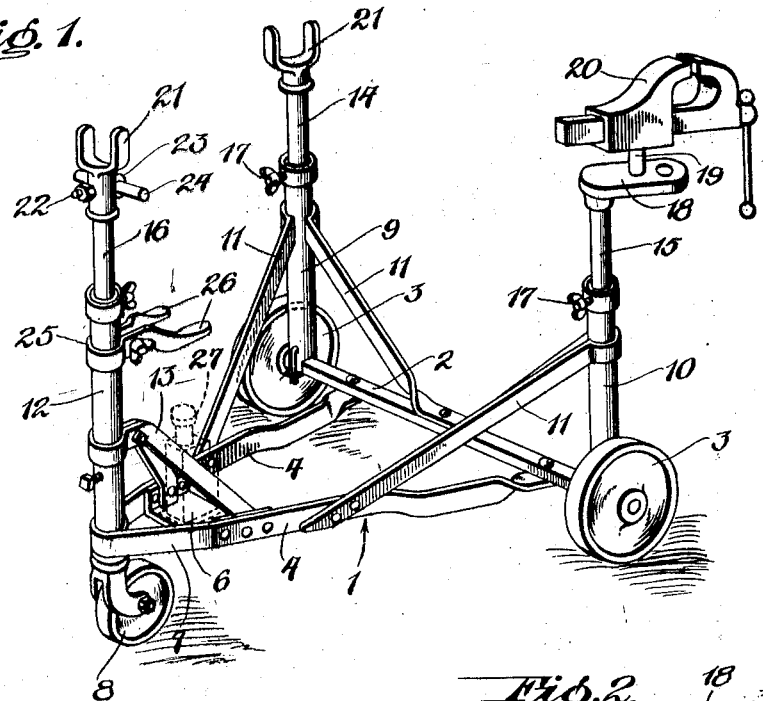
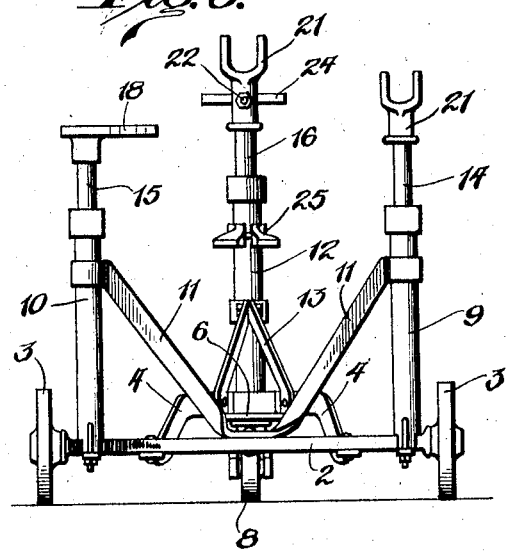
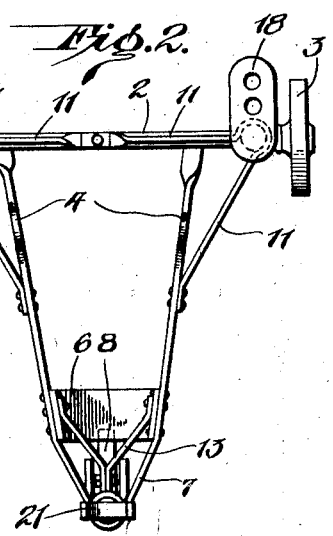
Inventor
F. A. Valenta
By Jas. A. Richmond
Attorney

UNITED STATES PATENT OFFICE.

FRANK A. VALENTA, OF SCHWERTNER, TEXAS.

PORTABLE REPAIR UNIT.

Application filed January 3, 1924. Serial No. 684,204.

*To all whom it may concern:*

Be it known that I, FRANK A. VALENTA, a citizen of the United States, residing at Schwertner, in the county of Williamson and State of Texas, have invented certain new and useful Improvements in Portable Repair Units, of which the following is a specification.

This invention is a portable repair unit, and includes a stand mounted on wheels for movement from place to place, and equipped for conveniently and efficiently supporting and clamping various parts of a motor vehicle, when such parts are to be assembled, removed, or repaired.

The improved repair unit has a skeleton base arranged as a three-wheel truck, with tubular uprights to receive standards to be held at adjustable heights. Certain of these upright standards have fork terminals to provide rests, and another movably supports a clamp or vise for holding any article supported in one of the fork terminals, or other similar work. One of the uprights adjustably supports a carrier, and a platform is arranged on the skeleton base below the carrier, to receive a jack for co-operation with the carrier, in supporting or clamping a spring for the vehicle.

The invention is illustrated in the accompanying drawings, in which:—

Fig. 1 is a perspective view of the improved repair unit.

Fig. 2 is a plan view.

Fig. 3 is a rear elevational view.

The improved repair unit comprises a skeleton base 1, comprising a rear transverse member 2, serving as an axle support for the rear wheels 3, and side bars 4, which converge forwardly from the axle to a transverse platform 6, from which forward side bars 7 converge to the forward end or point of the base, at which point is swiveled in any appropriate manner the forward wheel 8.

Tubular uprights 9 and 10 are supported on the axle 2, immediately adjacent the wheel mountings thereon, and braces 11 lead from these uprights to the base side bars 4, and from the axle at the point of support of the uprights to the side bars. A similar upright 12 is supported at the forward end or point of the base, braces 13 maintaining its position.

Standards 14, 15, and 16 are slidably and rotatably arranged in the respective uprights 9, 10, and 12, and these standards are held in vertical adjustment through any appropriate means, such for example, as the usual threaded co-operation with nut heads rotatable in or on the uprights, latches engaging holes in the standards, or clips, as 17, engaging the standards and bearing on the upper ends of the uprights. The manner of this particular adjustment is so well known in the art that the various means to this end, such as described, needs no particular illustration herein. The upper ends of standards 14 and 16 are provided with fork or U-shaped terminals 21 to serve as rests, and the upper end of standard 15 is provided with a plate 18, in which is rotatably supported, as by a pin 19, an ordinary bench vise 20. This vise can be adjusted to any horizontal position, through its mounting on the plate, and to any vertical position, within the limits of the device, through adjustment of the standard.

The standard 16 is formed near its fork terminal 21, with an opening to receive a bar 22, threaded at one end to receive a clamping nut, and formed at the opposite end with an eye 23 to receive a pipe section 24, which is thus swiveled relative to the upright, but capable of being clamped fixedly thereto.

A carrier 25 is adjustably and rotatably mounted on the forward upright 16, this carrier having outstanding arms 26, spaced apart and terminating on a plane below the main portion of the carrier, to provide for more or less free co-operation with a jack, indicated at 27, to be supported on the platform 6.

In use, among other important functions, the repair unit may readily support a rear vehicle axle and connected part of the drive shaft, the forward end of the latter resting in the fork terminal 21 of the standard 16, while one end of the axle is supported in the fork terminal 21 of the standard 14, with the other end of the axle held by the vise 20. Thus the vehicle axle assembly may be conveniently supported while being detached from the vehicle, bodily removed from beneath the vehicle, repaired, and then moved beneath the vehicle for replacement, in a simple and labor saving manner. Of course the standards are to be adjusted to accommodate the axle assembly, and this capability of the repair unit adapts it for universal use. A spring assembly may be arranged in proper order, and clamped between the carrier 25 and the jack 27, and, through the portability of the repair unit, moved into proper position beneath the vehicle, and secured in position.

The repair unit is capable of many other uses in connection with the repair of a motor vehicle which will readily suggest themselves to any one, not the least of which is the utility of the repair unit as a support for disabled vehicles, in towing same to a garage, the unit being capable of being secured in practically any position to the vehicle, and providing a strong secure wheeled support. Of course, under some conditions of towing, the swiveled front wheel 8 should be locked against swiveling action, and the invention contemplates any convenient and well-known means to this end, as for example, a pin extended through the upright 16 and the upright shaft on which the wheel 8 is carried.

The entire construction is of metal, and by reason of its skeleton formation, comparatively light in weight. The standards are interchangeable, giving the advantage of the vise at any particular point required for the work in hand.

Having thus described the invention, what is claimed as new, is:—

1. A repair unit comprising a wheeled base, standards vertically adjustable thereon, fork-terminals for certain of the standards, and a vise carried by and adjustable relatively to another of said standards.

2. A repair unit comprising a three-wheel base, a tubular upright rising from the base adjacent each wheel, standards vertically and rotatably adjustable in the uprights, a clamp carried by one of the standards, and receiving terminals formed on the other standards.

3. A repair unit comprising a three-wheel base, a tubular upright rising from the base adjacent each wheel, standards adjustable in and interchangeable relative to the standards, and a vise carried by and rotatably mounted on one of said standards.

4. A repair unit comprising a wheeled base, tubular uprights carried by the base, a platform secured to the base near the forward upright, standards adjustable in the uprights and having article-supporting means at their upper ends, and a carrier adjustable on the forward upright and overlying the platform to permit co-operation with a jack on the platform for securing articles transverse the base.

In testimony whereof I affix my signature.

FRANK A. VALENTA.